(12) United States Patent
Perfetto et al.

(10) Patent No.: US 12,158,131 B2
(45) Date of Patent: Dec. 3, 2024

(54) FUEL SYSTEM

(71) Applicant: Cummins Inc., Columbus, IN (US)

(72) Inventors: Anthony K. Perfetto, Columbus, IN (US); Samuel C. Geckler, Columbus, IN (US); Adam C. Cecil, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/514,595

(22) Filed: Nov. 20, 2023

(65) Prior Publication Data

US 2024/0084771 A1 Mar. 14, 2024

Related U.S. Application Data

(63) Continuation of application No. PCT/US2022/018750, filed on Mar. 3, 2022.

(60) Provisional application No. 63/196,869, filed on Jun. 4, 2021.

(51) Int. Cl.
| | |
|---|---|
| *F02M 69/00* | (2006.01) |
| *F02M 69/04* | (2006.01) |
| *F02M 69/46* | (2006.01) |
| *F02M 69/54* | (2006.01) |

(52) U.S. Cl.
CPC ........ *F02M 69/465* (2013.01); *F02M 69/042* (2013.01); *F02M 69/54* (2013.01)

(58) Field of Classification Search
CPC ..... F02M 69/465; F02M 69/042; F02M 69/54
See application file for complete search history.

(56) References Cited

U.S. PATENT DOCUMENTS

| | | | | |
|---|---|---|---|---|
| 4,936,280 A * | 6/1990 | Langlois | ............ | F02D 19/0692 |
| | | | | 123/179.17 |
| 5,546,908 A * | 8/1996 | Stokes | .................. | F02M 31/18 |
| | | | | 123/480 |
| 7,412,966 B2 * | 8/2008 | Lewis | .................. | F02D 19/061 |
| | | | | 123/1 A |
| 7,647,916 B2 * | 1/2010 | Leone | ................ | F02M 25/0227 |
| | | | | 123/25 Q |
| 7,712,451 B2 * | 5/2010 | Hung | .................. | F02D 19/0692 |
| | | | | 123/431 |
| 8,393,312 B2 * | 3/2013 | Lewis | .................. | F02D 41/062 |
| | | | | 123/305 |
| 9,488,113 B2 * | 11/2016 | Kern | ..................... | F02D 19/021 |
| 9,726,106 B2 * | 8/2017 | Surnilla | ................ | F02D 41/345 |
| 9,771,887 B2 * | 9/2017 | Felix Moreno | ..... | F02D 41/3094 |
| 9,874,168 B2 * | 1/2018 | Thomas | ............. | F02D 41/3094 |
| 10,450,991 B2 * | 10/2019 | Miyata | ................ | F02D 41/3094 |
| 10,458,327 B2 | 10/2019 | Klyza et al. | | |

(Continued)

FOREIGN PATENT DOCUMENTS

| | | |
|---|---|---|
| DE | 102018104856 A1 | 9/2019 |
| WO | 200125618 A1 | 4/2001 |

OTHER PUBLICATIONS

International Search Report and Written Opinion for International patent application No. PCTUS2022018750, filed Mar. 3, 2022, mailed Jun. 29, 2022, 13 pgs.

*Primary Examiner* — Phutthiwat Wongwian
*Assistant Examiner* — Sherman D Manley
(74) *Attorney, Agent, or Firm* — Taft, Stettinius & Hollister LLP

(57) ABSTRACT

Low-cost fuel injection systems for internal combustion engines, including vapor fuel engines are provided.

20 Claims, 6 Drawing Sheets

(56) References Cited

U.S. PATENT DOCUMENTS

| | | | |
|---|---|---|---|
| 2007/0034192 A1* | 2/2007 | Kamio | F02D 19/0671 |
| | | | 123/478 |
| 2014/0156174 A1* | 6/2014 | Lee | F02D 41/34 |
| | | | 123/445 |
| 2014/0182554 A1* | 7/2014 | Lee | F02M 61/145 |
| | | | 123/470 |
| 2015/0240739 A1* | 8/2015 | Pursifull | F02D 41/3094 |
| | | | 123/445 |
| 2016/0017819 A1* | 1/2016 | Miyata | F02D 41/3094 |
| | | | 701/104 |
| 2016/0053729 A1* | 2/2016 | Geckler | F02D 41/0025 |
| | | | 123/445 |
| 2016/0265449 A1* | 9/2016 | Kern | F02M 57/04 |
| 2017/0022917 A1* | 1/2017 | Thomas | F02D 41/062 |
| 2017/0370277 A1* | 12/2017 | Bunjes | A61B 3/14 |
| 2018/0017013 A1 | 1/2018 | Khosravi et al. | |
| 2019/0024604 A1 | 1/2019 | Kurtz et al. | |

* cited by examiner

All injectors can be independently controlled.

FUEL SYSTEM

CROSS-REFERENCE TO RELATED APPLICATION

This application is a continuation of International PCT Application No. PCT/US2022/018750 filed on Mar. 3, 2022, which claims priority to U.S. Provisional Application No. 63/196,869, filed on Jun. 4, 2021, each of which is incorporated herein by reference in its entirety for all purposes.

FIELD OF THE DISCLOSURE

The present disclosure relates to an engine fuel system.

BACKGROUND

Internal combustion engines are utilized to power, e.g., a number of different types of vehicles. A fuel injection system introduces fuel into the combustion chambers of the engine for ignition to power the engine. A number of different fuels, including natural gas, e.g., compressed natural gas (in vapor form) are used to fuel internal combustion engines.

Fuel injection systems can feature direct injectors that communicate fuel directly to the combustion chambers of the internal combustion engine. Fuel injection systems can also feature port fuel injectors that communicate fuel to the intake port upstream of the intake valve and combustion chamber. With port injectors, injected fuel is mixed with intake air prior to reaching the combustion chamber.

SUMMARY

The present disclosure provides low-cost fuel injection systems for internal combustion engines.

In one form of the disclosure, a fuel system comprises: a source of a fuel; a fuel rail in fluid communication with the source of fuel to accumulate a quantity of the fuel at a fuel rail pressure; a port fuel injector in fluid communication with the fuel rail to receive a port fuel injector portion of the quantity of the fuel at the fuel rail pressure; a direct fuel injector in fluid communication with the fuel rail to receive a direct fuel injector portion of the quantity of the fuel at the fuel rail pressure; a cylinder defining a combustion chamber; and an intake port selectively supplying air to the combustion chamber, the port fuel injector in fluid communication with the intake port to selectively supply the port fuel injector portion of the quantity of the fuel to the intake port, the direct fuel injector in fluid communication with the combustion chamber to selectively supply the direct fuel injector portion of the quantity of the fuel to the combustion chamber.

In an example thereof, the source of the fuel comprises a fuel storage tank.

In a further example thereof, the fuel system further comprises: a pressure regulator in fluid communication with the source of the fuel and the fuel rail, the source of the fuel maintaining a fuel source pressure greater than the fuel rail pressure.

In another example thereof, the fuel system further comprises an intake valve positioned to selectively restrict fluid communication between the intake port and the combustion chamber in a closed position of the intake valve, the intake valve having an open position allowing fluid communication between the intake port and the combustion chamber.

In yet another example thereof, the port fuel injector comprises a first port fuel injector and the port fuel injector portion of the quantity of the fuel comprises a first port fuel injector portion of the quantity of the fuel, and wherein the fuel system further comprises: a second port fuel injector in fluid communication with the fuel rail to receive a second port fuel injector portion of the quantity of the fuel at the fuel rail pressure, the second port fuel injector in fluid communication with the intake port to selectively supply the second port fuel injector portion of the quantity of the fuel to the intake port.

In another form of the disclosure, a port fuel injection system comprises: a fuel rail system; a high flow fuel injector configured to supply fuel from the fuel rail system to a plurality of ports of an engine cylinder when activated; a first low flow fuel injector configured to supply fuel from the fuel rail system to one of the plurality of ports when activated; and a second low flow fuel injector configured to supply fuel from the fuel rail system to another of the plurality of ports when activated.

In an example thereof, the port fuel injection system further comprises: a single controller configured to respond to a fuel demand by activating the high flow fuel injector, the first low flow fuel injector and the second low flow fuel injector, each for a substantially equal period of time.

In an example thereof, the single controller selectively provides a first voltage to the high flow fuel injector and the single controller selectively provides a second voltage to the first low flow fuel injector and to the second low flow fuel injector, the first voltage higher than the second voltage.

In a further example thereof, the port fuel injection system further comprises: a single controller configured to respond to a fuel demand exceeding a threshold value by activating the high flow fuel injector, the first low flow fuel injector and the second low flow fuel injector, each for a substantially equal period of time, the single controller further configured to respond to a fuel demand being less than the threshold by activating the first low flow fuel injector and the second low flow fuel injector without activating the high flow fuel injector.

In an example thereof, the single controller comprises an engine control unit.

In an example thereof, the fuel rail system comprises a single fuel rail supplying fuel to the high flow fuel injector, the first low flow fuel injector, and the second low flow fuel injector.

In an example thereof, the port fuel injection system further comprises: an engine, the fuel rail system receiving fuel for the engine.

In another exemplary embodiment of the present disclosure, a port fuel injection system comprises: a fuel rail system; a high flow fuel injector configured to supply fuel from the fuel rail system to a plurality of ports of an engine cylinder when activated; a first low flow fuel injector configured to supply fuel from the fuel rail system the plurality of ports of an engine cylinder when activated; and a second low flow fuel injector configured to supply fuel from the fuel rail system to the plurality of ports of an engine cylinder when activated.

In an example thereof, the port fuel injection system further comprises: a single controller configured to respond to a fuel demand by activating the high flow fuel injector, the first low flow fuel injector and the second low flow fuel injector, each for a substantially equal period of time.

In an example thereof, the single controller selectively provides a first voltage to the high flow fuel injector and the single controller selectively provides a second voltage to the first low flow fuel injector and to the second low flow fuel injector, the first voltage higher than the second voltage.

In an example thereof, the port fuel injection system further comprises: a single controller configured to respond to a fuel demand exceeding a threshold value by activating the high flow fuel injector, the first low flow fuel injector and the second low flow fuel injector, each for a substantially equal period of time, the single controller further configured to respond to a fuel demand being less than the threshold by activating the first low flow fuel injector and the second low flow fuel injector without activating the high flow fuel injector.

In an example thereof, the single controller comprises an engine control unit.

In an example thereof, the fuel rail system comprises a single fuel rail supplying fuel to the high flow fuel injector, the first low flow fuel injector, and the second low flow fuel injector.

In an example thereof, the fuel rail system comprises a high flow fuel rail supplying fuel to the high flow fuel injector and a low flow fuel rail supplying fuel to the first low flow fuel injector and the second low flow fuel injector.

In a further example thereof, the port fuel injection system further comprises: an engine, the fuel rail system receiving fuel for the engine.

In an exemplary embodiment of the present disclosure, a fuel system comprises: an intake port; a first runner in fluid communication with the intake port; a second runner in fluid communication with the intake port; a cylinder defining a combustion chamber, the first runner allowing the combustion chamber to be placed in fluid communication with the intake port, the second runner allowing the combustion chamber to be placed in fluid communication with the intake port, the first runner positioned downstream from the intake port and upstream from the combustion cylinder, the second runner positioned downstream from the intake port and upstream from the combustion cylinder, whereby fluid in the intake port must choose one of the first and the second runner to travel from the intake port to the combustion chamber; and a high flow fuel injector in fluid communication with the intake port upstream of the first runner and upstream of the second runner, whereby a high flow of fuel from the high flow fuel injector can reach the combustion chamber through one of: the first runner alone, the second runner alone, and a combination of the first runner and the second runner.

In an example thereof, the fuel system further comprises a first low flow fuel injector in selective fluid communication with the combustion chamber.

In an example thereof, the first low flow fuel injector is in fluid communication with the first runner downstream of the intake port and upstream of the combustion chamber.

In an example thereof, the fuel system further comprises a second low flow fuel injector in selective fluid communication with the combustion chamber.

In an example thereof, the first low flow fuel injector is in fluid communication with the first runner downstream of the intake port and upstream of the combustion chamber, and the second low flow fuel injector is in fluid communication with the second runner downstream of the intake port and upstream of the combustion chamber.

In a further example thereof, the fuel system further comprises a single controller configured to respond to a fuel demand by activating the high flow fuel injector, the first low flow fuel injector and the second low flow fuel injector, each for a substantially equal period of time.

In an example thereof, the single controller selectively provides a first voltage to the high flow fuel injector and the single controller selectively provides a second voltage to the first low flow fuel injector and to the second low flow fuel injector, the first voltage higher than the second voltage.

In an example thereof, the fuel system further comprises a single controller configured to respond to a fuel demand exceeding a threshold value by activating the high flow fuel injector, the first low flow fuel injector and the second low flow fuel injector, each for a substantially equal period of time, the single controller further configured to respond to a fuel demand being less than the threshold by activating the first low flow fuel injector and the second low flow fuel injector without activating the high flow fuel injector.

In an example thereof, the single controller comprises an engine control unit.

In an example thereof, the fuel system further comprises a fuel rail arranged to supply fuel to all of the high flow fuel injector, the first low flow fuel injector, and the second low flow fuel injector.

In an exemplary embodiment of the present disclosure, a vapor port fuel injection system comprises a fuel rail; a high flow fuel injector including an inlet fluidly coupled to the fuel rail to receive vapor fuel contained in the fuel rail and an outlet in flow communication with a plurality of fuel runners; a plurality of low flow fuel injectors including a first low flow injector having an inlet fluidly coupled to the fuel rail and an outlet in flow communication with one of the fuel runners, and a second low flow injector having an inlet fluidly coupled to the fuel rail and an outlet in flow communication with another of the fuel runners, each of the fuel runners being in flow communication with a port of a cylinder of an engine; and a single controller electrically coupled to the high flow fuel injector to power the high flow fuel injector and electrically coupled to the plurality of low flow fuel injectors; wherein the controller is configured to respond to a fuel demand by activating each of the high flow fuel injector and the plurality of low flow fuel injectors for substantially the same period of time

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
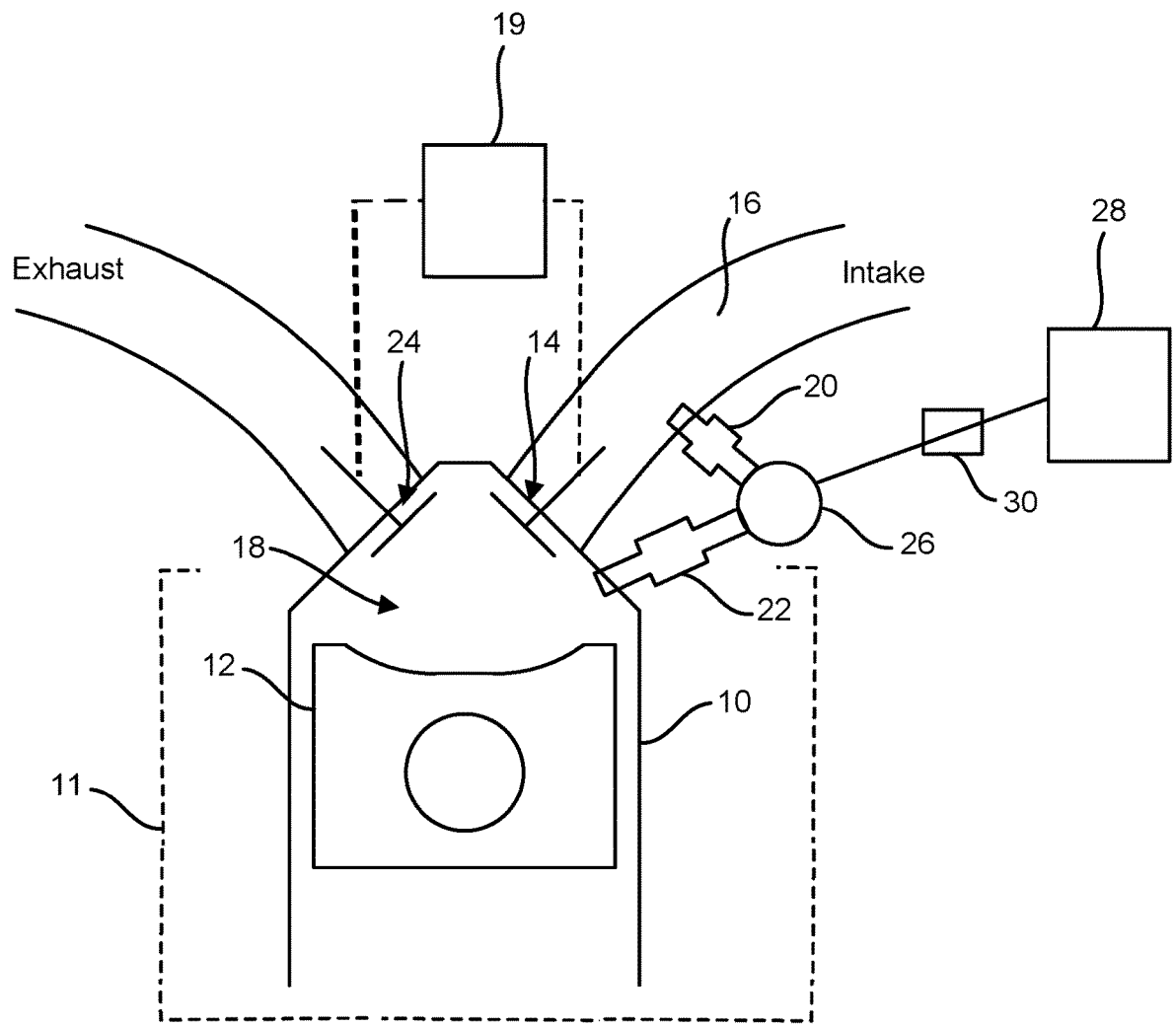
FIG. 1 is a schematic representation of portions of an engine including an engine cylinder arranged to receive fuel from a direct fuel injector (hereinafter "DI") and a port fuel injector (hereinafter "PFI"), with both the DI and the PFI receiving fuel at the same pressure from a common fuel rail.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features. The term couple is understood to include either direct or indirect coupling.

Referring to FIG. 1, cylinder 10 represents a cylinder of a multi-cylinder internal combustion engine 11 (hereinafter "IC engine"). All of the cylinders of the multi-cylinder IC engine §§ can be arranged as shown in FIG. 1. Cylinder 10 houses piston 12 and guides reciprocation of piston 12 in conventional fashion. Piston 12 is rotatably coupled to a piston rod which cooperates with an engine crankshaft to transmit reciprocation of piston 12 into rotation of the engine crankshaft in conventional fashion.

FIG. 1 shows intake valve 14 positioned and operable to selectively allow fluid communication between intake port 16 and combustion chamber 18 of cylinder 10. More particularly, intake valve 14 is controlled by a controller 19 such as an engine control unit (hereinafter "ECU"). Intake port 16 provides air together with any fuel provided by PFI 20 (described in more detail below) to combustion chamber 18. Fuel can also be provided to combustion chamber 18 via DI 22. After fuel and air combusts in combustion chamber 18, exhaust gasses are vented from combustion chamber 18 through exhaust valve 24. Like intake valve 14, exhaust valve 24 is controlled by the ECU.

PFI 20 is positioned to supply fuel to intake port 16 upstream of intake valve 14. DI is positioned to supply fuel directly to combustion chamber 18. Fuel rail 26 supplies fuel to both PFI 20 and DI 22 at the same pressure. To allow fuel rail 26 to supply fuel to both PFI 20 and DI 22, PFI 20 DI 22 are both arranged to intersect fuel rail 26.

Fuel rail 26 functions as an accumulator to store fuel to be supplied to PFI 20 and DI 22 at the desired working pressure. Specifically, fuel rail 26 is fluidly connected to fuel storage tank 28 (e.g., a vehicle fuel storage tank). Fuel in fuel storage tank 28 is held at a pressure higher than the desired pressure of fuel rail 26. Pressure regulator 30 is positioned in the fluid path between fuel storage tank 28 and fuel rail 26 to maintain the desired pressure in fuel rail 26.

In an exemplary embodiment, pressure regulator 30 is a mechanical pressure regulator.

In an alternative embodiment, fuel in fuel storage tank 28 can be communicated to fuel rail 26 when the ECU opens a valve (utilized in lieu of pressure regulator 30) positioned in the fluid path between fuel storage tank 28 and fuel rail 26. Temperature and pressure sensors positioned and arranged to read the pressure and temperature of fuel rail 26 supply temperature and pressure readings to the ECU, which, in this alternative embodiment can be used to facilitate the ECU maintaining proper working pressure in fuel rail 26 through actuation of the value.

In an exemplification of the present disclosure, fuel rail 26 is maintained at a pressure of 8 bar, while fuel storage tank 28 is maintained at a pressure of over 200 bar. The fuel implemented in this exemplification of the present disclosure can be compressed natural gas (hereinafter "CNG").

Figure 2:
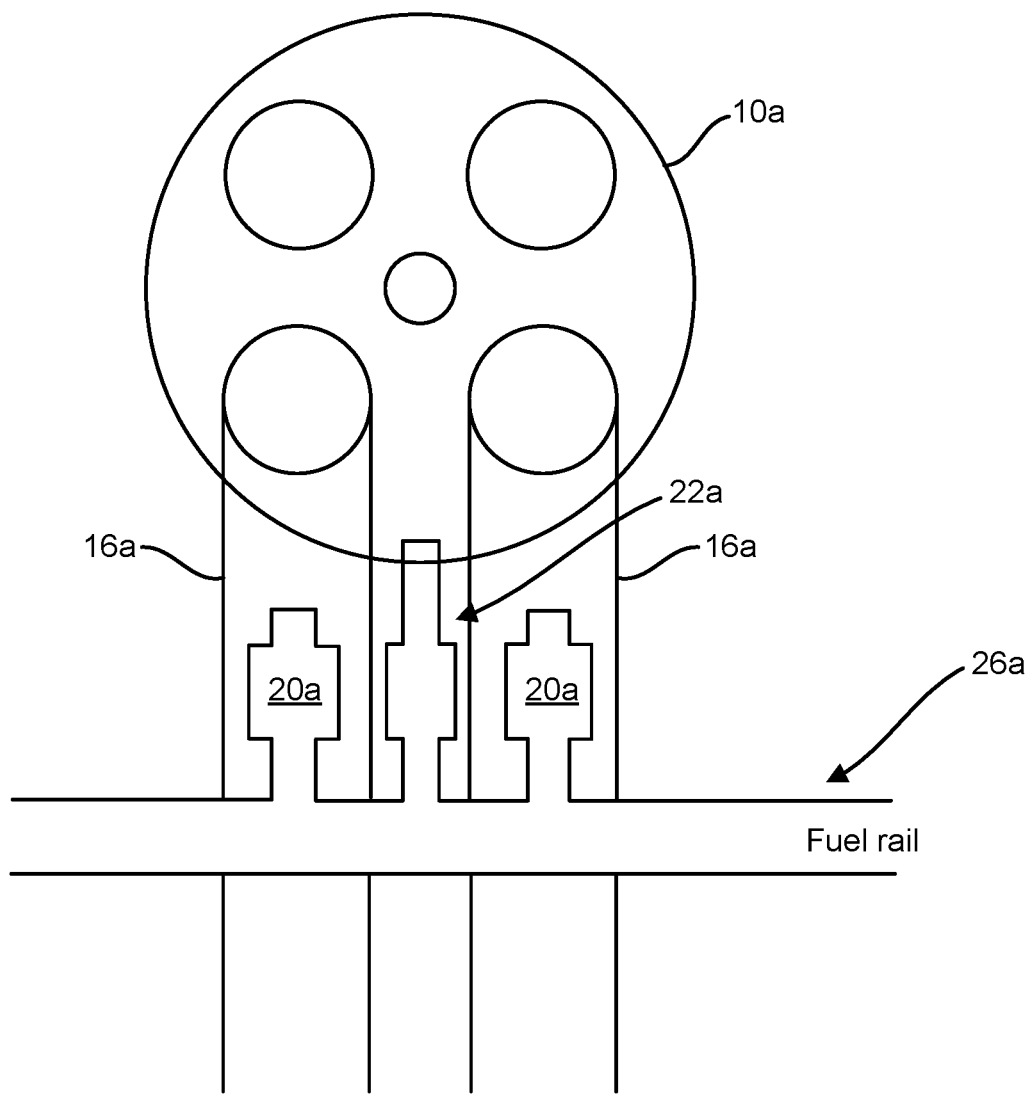
FIG. 2 is a schematic representation of portions of an engine including an engine cylinder arranged to receive fuel from a DI and a pair of PFIs, with both the DI and the PFIs receiving fuel at the same pressure from a common fuel rail.

FIG. 2 illustrates cylinder 10a featuring a pair of intake ports 16a, with a corresponding pair of intake valves (not shown), a pair of PFIs 20a, and a single DI 22a. While cylinder 10 implements a single PFI 20 and a single DI 22, cylinder 10a implements a pair of PFIs 20a, and a single DI 22a. Either a single exhaust port or dual exhaust ports can be implemented with a cylinder 10, 10a of the present disclosure.

PFI 20, 20a and DI 22, 22a are independently controlled by the ECU (timed to the engine crank angle); therefore, the systems of FIGS. 1 and 2 can implement any combination of direct and port fuel injection strategies, such as direct only (through DI 22, 22a), port fuel injection only (through PFI 20 or one or both of PFIs 20a), or a combination of direct and port fuel injection (through PFI 20 and DI 22, or one or both of PFIs 20a and DI 22a). Generally, the fraction of fuel supplied through direct injection decreases as engine speed increases.

Figure 3:
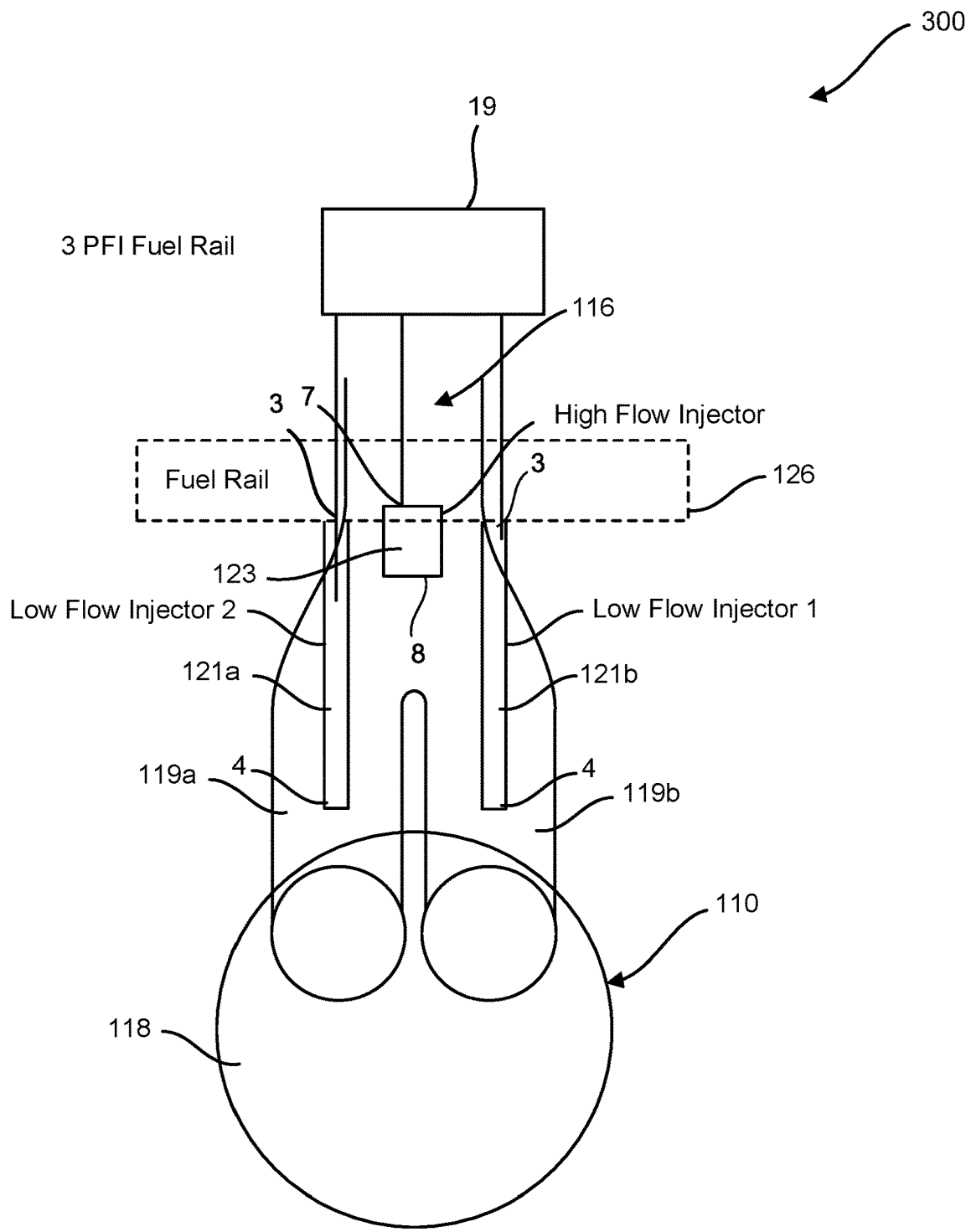
FIG. 3 is a schematic representation of an engine cylinder arranged to receive fuel from three PFIs, including two low flow PFIs and one high flow PFI, with all three PFIs in fluid communication with a common fuel rail supplying fuel at the same pressure to all three PFIs.

FIG. 3 illustrates an alternative fuel system (e.g., a fuel rail system 300) of the present disclosure. In the system of FIG. 3, cylinder 110 represents a cylinder of a multi-cylinder IC engine, for example a 6 cylinder engine. All of the cylinders of the multi-cylinder IC engine can be arranged as shown in FIG. 3. Cylinder 110 houses a piston as illustrated with respect to cylinder 10 in FIG. 1. As with the arrangement of FIG. 1, the piston is rotatably coupled to a piston rod which cooperates with an engine crankshaft to transmit reciprocation of piston 12 into rotation of the engine crankshaft in conventional fashion.

Intake port 116 is in fluid communication with combustion chamber 118 via a pair of runners 119a, 119b. Runners 119a, 119b are each in fluid communication with intake port 116 to receive intake air therefrom. Runners 119a 119b define a fork in the fluid flow path of intake port 116. That is, fluid (air, fuel) flowing through intake port 116 must flow through one of runners 119a, 119b to reach combustion chamber 118 to which the downstream ends of runners 119a, 119b are fluidly connected. At the downstream end of runner 119a, a port connects runner 119a to combustion chamber 118. As illustrated with respect to the embodiment of FIG. 1, an intake valve controls fluid communication between runner 119a and combustion chamber 118. Similarly, at the downstream end of runner 119b, a port connects runner 119b to combustion chamber 118. As illustrated with respect to the embodiment of FIG. 1, an intake valve controls fluid communication between runner 119b and combustion chamber 118.

Fuel rail 126 functions as an accumulator to receive fuel from a fuel tank (as with fuel rail 26 and fuel storage tank 28 of the embodiment of FIG. 1) and supply fuel at constant pressure to a plurality of fuel injectors 121a, 121b, 123. Pressure in fuel rail 126 can be maintained as described above with respect to fuel rail 26, e.g., with a pressure regulator. Low flow fuel injectors 121a, 121b are capable of providing flow of fuel at a rate of 5-19 kg/hr, while high flow fuel injector 123 is capable of providing flow of fuel at a rate of 20-80 kg/hr. Both low flow fuel injectors 121 and high flow fuel injector 123 are port fuel injectors. For instance, an example implementation can include first and second port fuel injectors (e.g., 121, 123). Specifically, both low flow fuel injectors 121 and high flow fuel injector 123 provide fuel to combustion chamber 118 with the flow of air from intake port 116, as opposed to a direct injector which provides the flow of fuel directly to the combustion chamber.

High flow fuel injector 123 is positioned to deliver fuel in intake port 116 upstream of the fork defined by runners 119a, 119b. Therefore, the fuel delivered by high flow fuel injector 123 can traverse either runner 119a, 119b to reach combustion chamber 118. Runners 119a, 119b terminate in an intake valve similar to valve 14 shown in FIG. 1. If the intake valve associated with runner 119a is opened by the ECU, then the fuel injected by high flow fuel injector 123 will traverse runner 119a. If the intake valve associated with runner 119b is opened by the ECU, then the fuel injected by high flow fuel injector 123 will traverse runner 119b.

Each low flow fuel injector 121 is positioned to deliver fuel flow downstream of the fork defined by runners 119a, 119b. Specifically, low flow fuel injector 121a provides fuel flow in runner 119a, while low flow fuel injector 121b provides fuel flow in runner 119b. In this embodiment of the present disclosure, a combination of high flow and low flow fuel injectors are utilized for each cylinder of a multi-cylinder engine.

Figure 6:
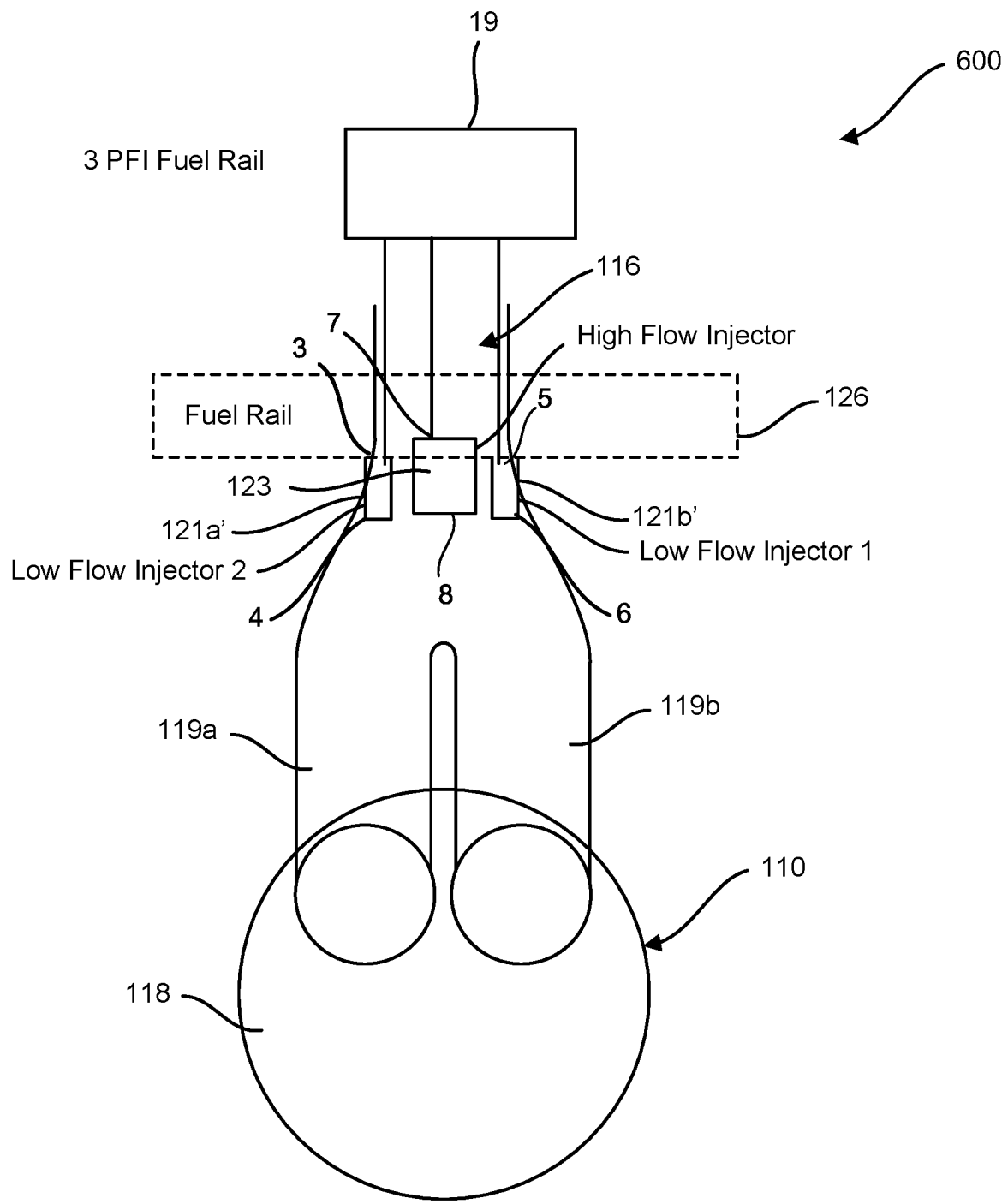
FIG. 6 is a schematic representation of an alternative engine cylinder arranged to receive fuel from three PFIs, including two low flow PFIs and one high flow PFI, with all three PFIs in fluid communication with a common fuel rail supplying fuel at the same pressure to all three PFIs.

FIG. 6 illustrates an alternative (e.g., fuel rail system 600) to the embodiment shown in FIG. 3, with low flow fuel injectors 121a', 121b' positioned to inject fuel in intake port 16 upstream of the fork defined by runners 119a, 119b. Therefore, the fuel delivered by low flow fuel injectors 121a', 121b' can (like the fuel delivered by high flow fuel injector 123) traverse either runner 119a, 119b to reach combustion chamber 118. Like the flow from high flow fuel injector 123, if the intake valve associated with runner 119a is opened by the ECU, then the fuel injected by low flow fuel injector 121a' and/or 121b' will traverse runner 119a. If the intake valve associated with runner 119b is opened by the ECU, then the fuel injected by low flow fuel injector 121a' and/or 121b' will traverse runner 119b. This arrangement may be beneficial in certain engine packaging arrangements.

Throughout this document, reference to low flow fuel injectors 121 generally is to be understood as a reference to each of the low flow fuel injectors 121a, 121b of FIG. 3 and the low flow fuel injectors 121a', 121b', unless specified otherwise. Similarly, any description of low flow fuel injectors 121a, 121b of FIG. 3 other than the location thereof extends to low flow fuel injectors 121a', 121b' of FIG. 6.

High flow fuel injector 123 is much larger than low flow fuel injectors 121 and requires more power to operate. High flow fuel injector 123 can be run at, e.g., 48 or 60 volts, while low flow fuel injectors 121 operate at 12 volts. Therefore, low flow fuel injectors 121 can be simply run off vehicle power, with the ECU providing a control signal to actuate. High flow fuel injector 123 requires a power supply higher than standard vehicle voltage. Because of the power requirements, the ECU can only operate one high flow fuel injector per cylinder. Using two low flow fuel injectors 121 together with a high flow fuel injector 123 at each cylinder 110 provides fuel to each cylinder 110 at a rate commensurate with what would be achieved with two high flow fuel injectors 123 at each cylinder 110. While two high flow fuel injectors at each cylinder would require a second ECU to control, the arrangement of the present disclosure can be controlled with a single ECU. Additionally, combining a low flow fuel injector 121 with a high flow fuel injector 123 improves the turndown ratio of the fuel system such that idle fuel flow rates can be controlled accurately.

Figure 4:
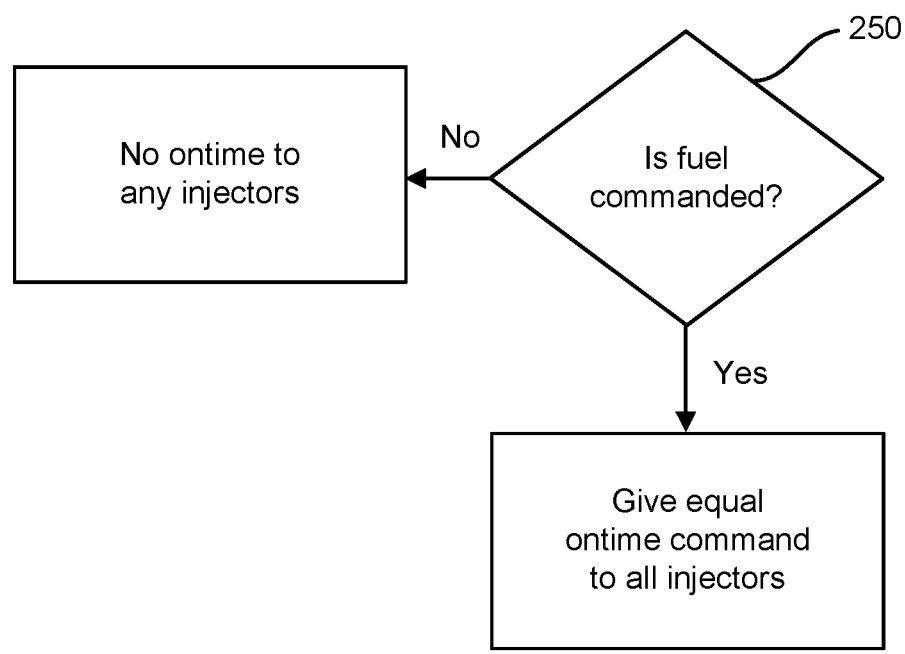
FIG. 4 is a flow chart depicting a primary control of the arrangement shown in FIG. 3.

Referring to FIG. 4, the embodiment of FIG. 3 is operated, in one exemplification thereof, with all of the fuel injectors 121a, 121b, 123 operating at the same time. Specifically, if fuel is commanded in step 250, then all fuel injectors 121a, 121b, 123 operate to provide fuel with an equal ontime command provided to all fuel injectors 121a, 121b, 123. If fuel is not commanded in step 250, then none of fuel injectors 121a, 121b, 123 provide fuel.

Figure 5:
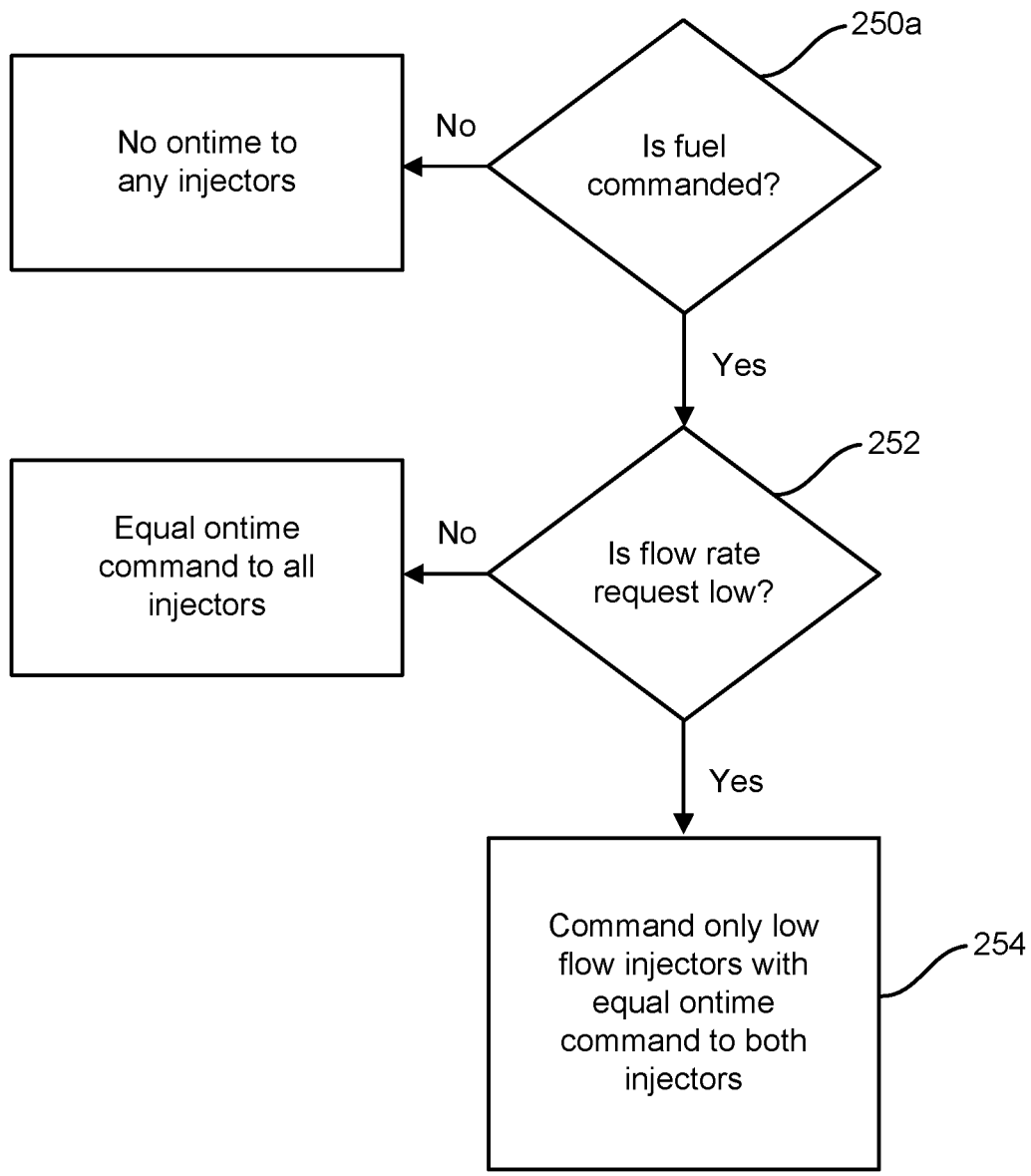
FIG. 5 is a flow chart depicting a secondary control of the arrangement shown in FIG. 3.

Referring to FIG. 5, the embodiment of FIG. 3 is operated, in another exemplification thereof, with all fuel injectors 121a, 121b, 123 operating at the same time in certain circumstances and only certain of the fuel injectors 121a, 121b, 123 operating in other circumstances. Specifically, if fuel is commanded in step 250a, then the method of FIG. 5 asks in step 252 is the flow rate request low. If the flow rate request is not low, then the method of FIG. 5 provides equal ontime command to all fuel injectors 121a, 121b, 123 such that all fuel injectors 121a, 121b, 123 operate to provide fuel. If, in step 252, it is determined that the flow rate request is low, then only low flow fuel injectors 121a, 121b receive an ontime command. If step 254 is reached, then low flow fuel injectors 121a, 121b provide fuel to combustion chamber 118, but high flow fuel injector 123 does not provide fuel to combustion chamber 118.

While FIG. 3 shows low flow fuel injectors 121a, 121b and high flow fuel injector 123 all connected to a common fuel rail, i.e., fuel rail 126, the low flow fuel injectors 121a, 121b could be positioned on and fed fuel from a first fuel rail, while the high flow fuel injector is positioned on and fed fuel from a second fuel rail. In alternative embodiments of the present disclosure, only a single low flow fuel injector 121 is utilized in lieu of the pair of low flow fuel injectors 121a, 121b.

The embodiment of FIGS. 3-5 may utilize CNG or propane as the fuel, with the fuel supplied as a vapor for combustion.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A fuel system, comprising:
a source of a fuel;
a fuel rail in fluid communication with the source of fuel to accumulate a quantity of the fuel at a fuel rail pressure;
a port fuel injector in fluid communication with the fuel rail to receive a port fuel injector portion of the quantity of the fuel at the fuel rail pressure;
a direct fuel injector in fluid communication with the fuel rail to receive a direct fuel injector portion of the quantity of the fuel at the fuel rail pressure;
a cylinder defining a combustion chamber; and an intake port selectively supplying air to the combustion chamber, the port fuel injector in fluid communication with the intake port to supply the port fuel injector portion of the quantity of the fuel to the intake port, the direct fuel injector in fluid communication with the combustion chamber to supply the direct fuel injector portion of the quantity of the fuel to the combustion chamber, wherein the port fuel injector portion of the quantity of the fuel and the direct fuel injector portion of the quantity of the fuel are selectively supplied to the combustion chamber based on an on-time fuel command.

2. The fuel system of claim 1, wherein the source of the fuel comprises a fuel storage tank.

3. The fuel system of claim 1, further comprising:
a pressure regulator in fluid communication with the source of the fuel and the fuel rail, the source of the fuel maintaining a fuel source pressure greater than the fuel rail pressure.

4. The fuel system claim 1, further comprising an intake valve positioned to selectively restrict fluid communication between the intake port and the combustion chamber in a closed position of the intake valve, the intake valve having an open position allowing fluid communication between the intake port and the combustion chamber.

5. The fuel system of claim 1, wherein the port fuel injector comprises a first port fuel injector and the port fuel injector portion of the quantity of the fuel comprises a first port fuel injector portion of the quantity of the fuel, and wherein the fuel rail system further comprises:
a second port fuel injector in fluid communication with the fuel rail to receive a second port fuel injector portion of the quantity of the fuel at the fuel rail pressure, the second port fuel injector in fluid communication with the intake port to selectively supply the second port fuel injector portion of the quantity of the fuel to the intake port.

6. A port fuel injection system, comprising:
a fuel rail system;
a high flow fuel injector configured to supply fuel from the fuel rail system to a plurality of ports of an engine cylinder when activated;
a first low flow fuel injector configured to supply fuel from the fuel rail system to one of the plurality of ports when activated; and
a second low flow fuel injector configured to supply fuel from the fuel rail system to another of the plurality of ports when activated,
wherein the high flow fuel injector, the first low flow fuel injector, and the second low flow fuel injector are selectively activated in response to a fuel demand.

7. The port fuel injection system of claim 6, further comprising:
a single controller configured to respond to the fuel demand by activating the high flow fuel injector, the first low flow fuel injector and the second low flow fuel injector, each for a substantially equal period of time.

8. The port fuel injection system of claim 7, wherein the single controller selectively provides a first voltage to the high flow fuel injector and the single controller selectively provides a second voltage to the first low flow fuel injector and to the second low flow fuel injector, the first voltage higher than the second voltage.

9. The port fuel injection system of claim 6, further comprising:
a single controller configured to respond to the fuel demand exceeding a threshold value by activating the high flow fuel injector, the first low flow fuel injector and the second low flow fuel injector, each for a substantially equal period of time, the single controller further configured to respond to a fuel demand being less than the threshold by activating the first low flow fuel injector and the second low flow fuel injector without activating the high flow fuel injector.

10. The port fuel injection system of claim 7, wherein the single controller comprises an engine control unit.

11. The port fuel injection system of claim 6, wherein the fuel rail system comprises a single fuel rail supplying fuel to the high flow fuel injector, the first low flow fuel injector, and the second low flow fuel injector.

12. The port fuel injection system of claim 6, wherein the fuel rail system comprises a high flow fuel rail supplying fuel to the high flow fuel injector and a low flow fuel rail supplying fuel to the first low flow fuel injector and the second low flow fuel injector.

13. The port fuel injection system of claim 6, further comprising:
an engine, the fuel rail system receiving fuel for the engine.

14. A port fuel injection system, comprising:
a fuel rail system;
a high flow fuel injector configured to supply fuel from the fuel rail system to a plurality of ports of an engine cylinder when activated;
a first low flow fuel injector configured to supply fuel from the fuel rail system to the plurality of ports of the engine cylinder when activated; and
a second low flow fuel injector configured to supply fuel from the fuel rail system to the plurality of ports of the engine cylinder when activated,
wherein the high flow fuel injector, the first low flow fuel injector, and the second low flow fuel injector are selectively activated in response to a fuel demand.

15. The port fuel injection system of claim 14, further comprising:
a single controller configured to respond to the fuel demand by activating the high flow fuel injector, the first low flow fuel injector and the second low flow fuel injector, each for a substantially equal period of time.

16. The port fuel injection system of claim 15, wherein the single controller selectively provides a first voltage to the high flow fuel injector and the single controller selectively provides a second voltage to the first low flow fuel injector and to the second low flow fuel injector, the first voltage higher than the second voltage.

17. The port fuel injection system of claim 14, further comprising:
a single controller configured to respond to the fuel demand exceeding a threshold value by activating the high flow fuel injector, the first low flow fuel injector and the second low flow fuel injector, each for a substantially equal period of time, the single controller further configured to respond to the fuel demand being less than the threshold by activating the first low flow fuel injector and the second low flow fuel injector without activating the high flow fuel injector.

18. The port fuel injection system of claim 14, wherein the fuel rail system comprises a single fuel rail supplying fuel to the high flow fuel injector, the first low flow fuel injector and the second low flow fuel injector.

19. The port fuel injection system of claim 14, wherein the fuel rail system comprises a high flow fuel rail supplying fuel to the high flow fuel injector and a low flow fuel rail supplying fuel to the first low flow fuel injector and the second low flow fuel injector.

20. A vapor port fuel injection system, comprising:
a fuel rail;
a high flow fuel injector including an inlet fluidly coupled to the fuel rail to receive vapor fuel contained in the fuel rail and an outlet in flow communication with a plurality of fuel runners;
a plurality of low flow fuel injectors including a first low flow injector having an inlet fluidly coupled to the fuel rail and an outlet in flow communication with one of the fuel runners, and a second low flow injector having an inlet fluidly coupled to the fuel rail and an outlet in flow communication with another of the fuel runners, each of the fuel runners being in flow communication with an intake port of a cylinder of an engine; and
a single controller electrically coupled to the high flow fuel injector to power the high flow fuel injector and electrically coupled to the plurality of low flow fuel injectors;
wherein the controller is configured to respond to a fuel demand by activating each of the high flow fuel injector and the plurality of low flow fuel injectors for substantially the same period of time.

* * * * *